United States Patent Office 3,335,049
Patented Aug. 8, 1967

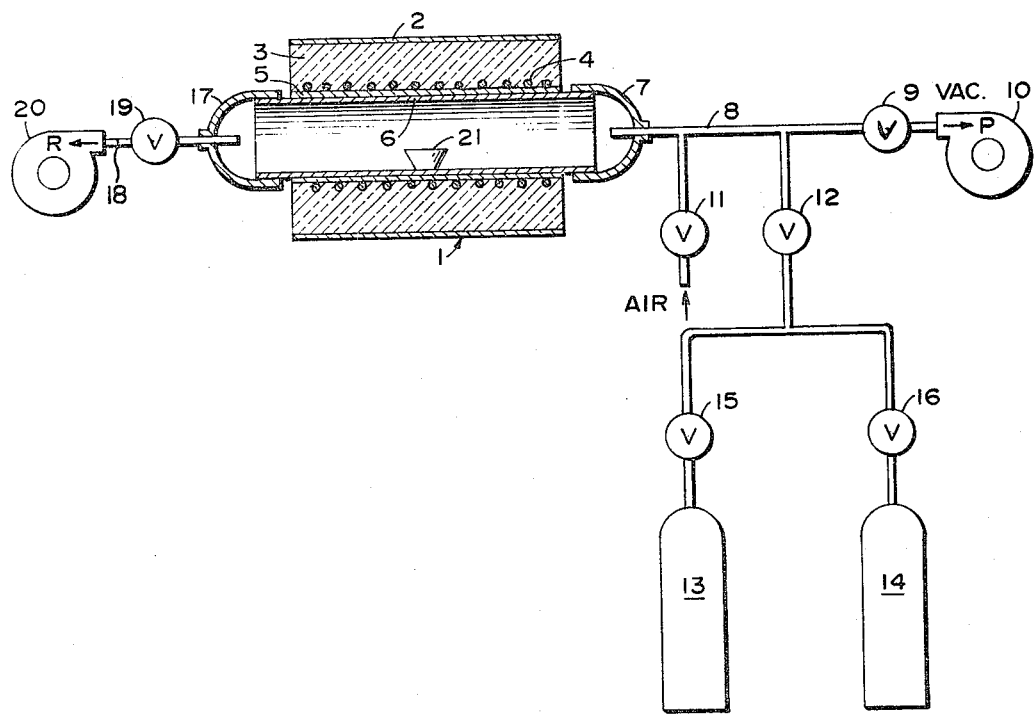

3,335,049
MANUFACTURE OF SILICA - SHEATHED SILICON CARBIDE FIBERS AND THE PRODUCT THEREOF
Wallace W. Pultz, Corning, N.Y., assignor to Corning Glass Works, Corning, N.Y., a corporation of New York
Filed Mar. 10, 1965, Ser. No. 438,578
16 Claims. (Cl. 161—176)

This invention relates to the production of fibers of beta-silicon carbide crystals. More particularly, this invention relates to the manufacture of submicroscopic fibers of beta-silicon carbide crystals which are eminently suitable for reinforcing plastics and metals.

It has long been known that plastics, metals, and even concretes could be greatly improved in strength when fibers having a high intrinsic mechanical strength were embedded therein. Much investigative work has resulted in the use of glass fibers in plastics, rubber, glasses and even in some metals. However, the common glass fibers have certain shortcomings which tend to restrict their use in such applications. These fibers, while quite strong inherently, do not nearly possess the strength of some crystalline materials, notably alumina and silicon carbide. Further, the resistance of these glasses to chemical attack, particularly at elevated temperatures, is something less than satisfactory and exposure to high temperatures causes a marked and continuous loss of strength due to the flow or deformation of the glass, especially under load, as its softening point is approached. It has been well-recognized by workers in the field that fibers composed of silicon carbide crystals are capable of withstanding elevated temperatures with no appreciable loss of strength under load and exhibit excellent resistance to chemical corrosion even at high temperatures.

Much research has been carried out in an effort to develop a method for producing silicon carbide fibers which would be commercially feasible. This laboratory work has resulted in fibers ranging in size from submicroscopic to others having diameters of 5 microns and lengths up to three inches. Although many methods for producing silicon carbide fibers have been explored including: (1) crystallization from liquid silicon carbide; (2) thermal decomposition of various volatile compounds of silicon and carbon; and (3) thermal reduction of various compounds of silicon and carbon in the presence of hydrogen, the most feasible process, from a practical point of view, contemplates the reaction of silica and carbon (generally sand and coke or graphite) brought about by subliming the starting materials such that the fibers are formed by vapor deposition. The cheapness and ready availability of substantially pure raw materials have been instrumental in leading experimenters to great efforts to develop a method for producing fibers therefrom. The extraordinary properties of silicon carbide fibers are well-known and the applications therefor are almost endless. Hence, the goal is deemed well worth the search.

The size of fiber which would be of the greatest untility in strengthening various materials has been much debated. One school of thought has supported the idea that very long fibers would be the most desirable while other researchers have stressed the advantages of very small, yea, submicroscopic, fibers. This second group has emphasized that discontinuities in the structure of the fiber frequenctly occur in the long fibers so that the tremendous intrinsic strength of the crystalline structure cannot be fully realized. These defects are substantially absent from the fine fibers. This invention is directed toward the manufacture of the latter type of fiber.

A commercially practical method for producing submicroscopic silicon carbide fibers was not developed in the past due to the process conditions required and the low fiber yields resulting therefrom. The basic procedure utilized by most prior researchers conceived of placing charges of sand and coke or graphite in a furnace which was first pumped to a high vacuum and thereafter the charges were heated above 2000° C., usually 2200°–2700° C., in a static or flowing atmosphere or argon, helium, or hydrogen. Not only were these temperatures very formidable for commercial practice but the amounts of fibers produced were very small and the size thereof far from uniform. Further, these processes produced crystals of both the low temperature, cubic beta-silicon carbide and the high temperature, hexagonal alpha-silicon carbide.

Therefore, the primary object of my invention is to provide a method for manufacturing submicroscopic fibers containing silicon carbide, wherein essentially all of the silicon carbide crystals are present as cubic beta-silicon carbide, which is relatively simple in operation, economical in practice, and which employs readily available and relatively inexpensive starting materials.

Another object of my invention is to provide a method for manufacturing submicroscopic fibers containing beta-silicon carbide crystals which are particularly suitable for reinforcing elements in plastics, rubber, and metals.

Still another object of my invention is to provide a method for manufacturing submicroscopic fibers containing beta-silicon carbide crystals which utilizes substantially all of the starting materials in producing the fibers, thus resulting in a highly efficient operation.

These and other objects will become apparent from the following description and a study of the appended drawing which is a diagrammatic arrangement of apparatus suitable for producing submicroscopic fibers containing beta-silicon carbide crystals according to the present invention.

I have discovered that the objects of this invention can be attained through the vapor deposition of fibers resulting from the reaction of silica and carbon in an environment of carbon monoxide and, optionally, an inert gas. In its broadest aspects, then my invention contemplates heating charges of silica and carbon to a critical temperature range in an atmosphere resulting from the introduction of carefully controlled partial pressures of an inert gas and carbon monoxide.

Defining the invention, now, in more specific terms, I have discovered that submicroscopic fibers containing silicon carbide crystals having diameters averaging about 250 A. (0.025 micron) and lengths up to 100 microns and sometimes longer can be produced by mixing together a charge of silica and carbon in a molar ratio of about 1:1 to 1:4, transferring this mixture to a furnace and exposing the charge to a temperature of at least about 1375° C., but not higher than about 1575° C., for a time sufficient to obtain the desired fiber formation during which period of time a carefully controlled partial pressure of carbon monoxide along with, optionally, an inert diluent gas selected from the group consisting of hydrogen, helium, neon, and argon is introduced, this partial pressure of carbon monoxide ranging from about 5 mm. to 500 mm. of mercury. For convenience, the total pressure within the reaction system is held at one atmosphere although pressures lower or higher can be utilized successfully. One practical consideration which should be taken into account with respect to the total pressure within the reaction chamber is the great loss of strength exhibited by refractory tubes at the use temperatures herein. Hence, even a moderate vacuum can cause the tube to collapse.

The mechanism leading to the production of the desired fibers is believed to be expressed in the following equations:

(1) $$SiO_2 + C \rightarrow SiO + CO$$

(2) $$3SiO + CO \rightarrow SiC + 2SiO_2$$

Hence, gaseous SiO and CO are first formed through the reaction of silica with carbon. These gases then are transported away from the starting materials and pass to a cooler area of the reaction chamber. The formation of submicroscopic fibers containing SiC crystals occurs in the range 1050°–1380° C., the major portion of the deposit normally occurring between 1100°–1300° C.

The fact that additions of carbon monoxide to this reaction system greatly increase the yield of SiC fibers would seem to be an anomaly since the law of mass action would indicate that additions of carbon monoxide would repress the first reaction cited above and thus reduce the overall yield of SiC fibers. The following theory is proposed as a possible explanation for this phenomenon based upon observations made of the residue of the solid reactants after the completion of the reaction. An examination of this residue demonstrated the presence of particulate SiC. Hence, it has been postulated this material resulted from:

(3) $$SiO_2 + 3C \rightarrow SiC + 2CO$$

Assuming this to be the mechanism for the development of this material, it can be observed that when this reaction occurs the available SiO for fiber growth is reduced. However, here again, the law of mass action would apply and the addition of carbon monoxide to the reaction system would repress this reaction. Thus, there appears to be a certain partial pressure of CO which leads to optimum SiO transport available for fiber growth. The decrease in the reaction rate of Equation 1 is more than compensated for by the decrease in residue SiC, Equation 3.

A molar ratio of silica to carbon up to as high as 1:10 can be utilized in successfully growing the desired fibers but such greater proportions of carbon are uneconomical since these result in large residues of unreacted carbon and also lead to the production of undesirable boat SiC. Where carbon is present in an amount less than the molar ratio of silica to carbon of 1:1, a residue of unreacted silica will be left after the fiber growth is concluded. My experiments have demonstrated that a molar ratio of silica-containing material to carbon-containing material of about 1:2 is ideal in that these proportions react to give the maximum rate of SiO generation and transport.

The growth of the desired fibers begins as soon as the reaction temperature is attained. Hence, it would be theoretically possible to design a continuous process for their manufacture wherein an amount of starting materials could be added to the reaction zone to exactly balance the amount of fibers removed after their production from the combination of the SiO and CO transported away from the starting materials. However, in actual practice, it has been found that a finite reaction time of about, say, two hours is required to insure a good yield of fibers which can be removed easily from the deposition area. Nevertheless, although the growth of these fibers is certainly time-dependent and much longer periods of reaction time, e.g., 24 hours, can be utilized with no apparent deleterious effect upon the structure of the fibers, the increase in fiber development is not very substantial after runs of such extended times. About three to five hours is deemed to be preferred in terms of commercial practice, taking into account the yield resulting therefrom in terms of the time involved.

The presence of oxygen in the reaction system acts to oxidize the original carbon starting material and the presence of nitrogen tends to repress the yield of fibers. Therefore, while a minor amount of oxygen and nitrogen can be tolerated, their substantial elimination is to be preferred. Hence, although a satisfactory yield of fibers can be obtained in a dynamic system wherein a flow of carbon monoxide is maintained during the heating of the charge to the reaction temperature so the residual air therein is flushed out before the reaction begins, it is more economical and efficient to first draw a vacuum of at least 5 mm. of mercury and, preferably, less than 1 mm. of mercury before or during the heating up to reaction temperature.

At temperatures below about 1375° C., the rate of fiber growth is so slow and the ultimate yield thereof so small as to be considered commercially impractical. At temperatures much above about 1575° C., the production of fibers of substantially uniform size becomes difficult to control and the fiber growth is prone to become excessively compacted.

As has been explained above, this invention is founded upon the discovery that the addition of carbon monoxide at a certain partial pressure to the reaction chamber enhances the yield of submicroscopic fibers containing beta-silicon carbide by the selective repression of the reaction leading to the production of particulate SiC. As is the case with many reactions, the combination of carbon and silica to form SiC proceeds more rapidly as the temperature in the reaction chamber is raised. Hence, as the temperature within the reaction chamber is increased, the transport of SiO and CO from the reaction mixture is more rapid but so is the production of particulate SiC. Therefore, it will be apparent that at higher temperatures effective repression of this undesirable reaction will normally require a higher partial pressure of carbon monoxide in the surrounding atmosphere. Thus, at temperatures around 1375° C., partial pressures of CO as low as about 5 mm. will be sufficient to satisfactorily repress the production of particulate SiC and promote an excellent yield of fibers, while at temperatures of 1575° C., partial pressures as high as 500 mm. may be required.

Experimentation has demonstrated that the most satisfactory growth of fibers occurs when exteremely pure starting materials are utilized. Nevertheless, very excellent yields have been achieved where relatively crude raw materials such as sand and charcoal have been employed. Likewise, although gases of the highest purity appear to yield the greatest growth of fibers, very acceptable yields have been obtained with the less pure varieties, it always being borne in mind that free oxygen and nitrogen should preferably be excluded.

One apparatus and procedure suitable for practicing the invention contemplates a furnace or reaction chamber consisting of a refractory tube wound with platinum wire in such a manner that a temperature gradient is set up along the length of the tube. A refractory ceramic or refractory metal container or "boat" containing the reaction charge is placed within the refractory tube at a position where the desired reaction temperature can be obtained. The furnace is then evacuated to a pressure of less than 5 mm. of mercury and, preferably, less than 1 mm. of mercury and then heated to at least about 600° C. under evacuation to allow complete outgassing. The temperature of the furnace is then raised to the raige 1375°–1575° C. in the area of the refractory boat, carbon monoxide being introduced at the desired partial pressures. The refractory boat is held at this temperature for the proper predetermined time after which the inert gas-carbon monoxide flow is stopped, the furnace cooled to below about 600° C. with the charge-containing boat retained therein, air introduced into the furnace chamber to further cool the chamber and restore atmospheric pressure therein, and then the boat and fiber deposit removed.

In the main, the fibers are white with a bluish cast although in some instances a small area of yellowish fibers has been observed. The individual fibers are very small, electron micrographs indicating diameters averaging about 0.025 micron with lengths up to 100 microns and greater, thus providing a maximum length to diameter ratio of about 40,000:1. Examination of the fibers utilizing electron microscopy and X-ray diffraction analysis has shown that, in general, the fibers consist of a core of beta-silicon carbide with a surface sheath of silica. The resistance to attack by acids and bases exhibited by SiC and $SiO_2$ is well-known and this property makes the use of these fibers ideal in filter elements. This surface sheath of $SiO_2$ is also of great practical importance in reinforcing applications for these fibers. Thus, these fibers are easily dispersible in both polar and non-polar liquids. Hence, a wide variety of both organic and inorganic matrices are available for strengthening. Also, powder metallurgy techniques can be utilized for strengthening metals since these fibers can be readily dispersed in water, dried, and then powdered. Finally, the surface sheath of $SiO_2$ in some reinforcing applications, notably with concretes and plastics, seems to promote the development of a better bond between the fibers and the material to be reinforced so the inherent strength of the fibers can be more fully utilized.

An apparatus suitable for carrying out the steps of the invention is illustrated in the accompanying drawings. Thus, a gradient furnace, shown generally in side elevation in cross section at 1 consists essentially of an alumina, mullite, or sillimanite refractory tube 5 wound with platinum or platinum-rhodium alloy wire 4 surrounded with insulation 3 which is retained within a steel casing 2. The windings of the wire are so spaced to set up a temperature gradient along the refractory tube 5. An inner or working liner 6, consisting of a mullite refractory tube, is inserted to protect the wire-wound tube from injury and corrosion as the fiber growth is being carried out, thereby precluding the hazard of a furnace failure resulting from the starting materials or the reaction products contacting the furnace windings. The working liner 6 extends a short distance beyond the front of the furnace and is there connected through a glass connection 7 to a pipe 8. Pipe 8 leads to a vacuum pump 10 through valve 9, or to a source of air (not shown) through valve 11, or the desired gaseous atmosphere may be introduced into pipe 8 through valve 12 from lecture bottles 13 and 14 through valves 15 and 16. The working liner 6 also extends beyond the rear of the furnace and is there connected through a glass connection 17 to a pipe 18. Pipe 18 leads through valve 19 to a pressure regulating device 20. A refractory ceramic or refractory metal boat 21 is positioned within the working liner 6 at the proper predetermined temperature. This boat contains a charge of sand and charcoal. In the following examples, an alumina refractory boat was used to contain the starting mixture.

In the actual operation of the apparatus, boat 21 is filled with the charge of batch materials and placed within working liner 6 at the proper position to be heated to the desired temperature. Pipes 8 and 18 are connected to the working liner 6 through the glass connections 7 and 17, respectively. Valves 11, 12 and 19 are closed and the furnace then heated to a temperature of about 1000° C. in the area of the refractory boat, the furnace chamber being simultaneously evacuated to a vacuum of 1 mm. of mercury through vacuum pump 10 to insure complete outgassing of the refractory components of the chamber and the charge ingredients. Valve 9 is then closed and valve 12 opened. Carbon monoxide from lecture bottle 13 and an inert gas, if desired, selected from the group consisting of hydrogen, helium, neon, and argon from lecture bottle 14 are introduced through valves 15 and 16, respectively, at the predetermined pressure. The furnace chamber is thereafter heated to obtain the desired temperature in the area of the refractory boat, valve 19 being simultaneously opened to enable the pressure regulating device 20 to maintain constant system pressure. The temperature is maintained for a suitable period of time for reaction to take place after which the furnace is cooled to about 600° C., valves 12, 15, 16, and 19 being closed. Air is then admitted through valve 11 to cool the furnace chamber and bring it to atmospheric pressure.

Boat 21 is then removed from the furnace and the fibers examined.

Table I records the effect of various temperatures upon the yield of fibers. Each batch charge was composed of acid-washed pulverized sand and charcoal thoroughly mixed together. Each charge was held at a temperature of about 1440° C. for about 3½ hours in the designated atmosphere. The apparatus employed was the same as that described in the preceding paragraph and the procedure followed was likewise the same as described above except for Example 23. In that example, a vacuum of about 5 microns of mercury was drawn and maintained throughout the run. Each description of the fiber growth is an attempt to rank the yield of fibers by visual observation within the series indicated in terms of the arbitrary figures 1 to 10 where 1 signifies the least growth of fibers.

TABLE I

| Ex. No. | Partial Pressure (mm.) | | | | | Description |
|---|---|---|---|---|---|---|
| | Hydrogen | Helium | Neon | Argon | Carbon Monoxide | |
| 1 | | | | | 5 | 7 |
| 2 | | | | | 50 | 10 |
| 3 | | | | | 100 | 7 |
| 4 | | | | | 250 | 5 |
| 5 | | | | | 500 | 2 |
| 6 | 5 | | | | 50 | 10 |
| 7 | 50 | | | | 50 | 10 |
| 8 | 100 | | | | 50 | 9 |
| 9 | 250 | | | | 50 | 8 |
| 10 | 500 | | | | 50 | 8 |
| 11 | | 5 | | | 50 | 10 |
| 12 | | 50 | | | 50 | 10 |
| 13 | | 100 | | | 50 | 9 |
| 14 | | 250 | | | 50 | 8 |
| 15 | | 500 | | | 50 | 8 |
| 16 | | | 50 | | 50 | 9 |
| 17 | | | 100 | | 50 | 8 |
| 18 | | | 250 | | 50 | 7 |
| 19 | | | | 5 | 50 | 9 |
| 20 | | | | 50 | 50 | 8 |
| 21 | | | | 100 | 50 | 7 |
| 22 | | | | 250 | 50 | 6 |
| 23 | (¹) | (¹) | (¹) | (¹) | (¹) | None. |

¹ Vacuum (partial pressure of about 5 microns).

Several pertinent observations can be drawn from Table I with respect to the effect of various atmospheres on fiber growth. First, a comparison of Example 23 with the others graphically demonstrates the need for a carrier gas. Second, at 1440° C., the partial pressure of the carbon monoxide used affects the growth of fibers, the greatest fibers yields being produced where the partial pressure of carbon monoxide is maintained at about 50 mm. of mercury. Third, where the partial pressure of carbon monoxide is held constant, an increase in the molecular weight of the inert gas decreases the growth of fibers. In summation, then, it can be said that an atmosphere containing carbon monoxide is extremely effective in making available the gaseous reaction product SiO necessary to form submicroscopic fibers containing beta-silicon carbide.

Table II records the effect of variations in reaction temperature upon the yield of fibers. In Examples 24–26, carbon monoxide at the indicated partial pressures constituted the atmosphere. In the remaining examples, a mixture of carbon monoxide and the indicated inert gas was utilized as the transporting medium for the gaseous reaction products. With the ceramic refractory tubes employed as reaction chambers for these examples, deformation of and actual collapse of the tube can occur at temperatures above about 1450° C. where a high vacuum is drawn. Therefore, at these temperatures a total pressure of about one atmosphere was maintained within the tube through this mixture of carbon monoxide and inert gas. Since the reaction of carbon and silica proceeds rather slowly at 1375° C., a reaction time of 15 hours was employed while at 1440° C., a reaction time of 3½ hours was utilized, and at 1525° C. and 1565° C., a reaction time of 2 hours. The batch compositions were the same as those of Examples 1–23.

TABLE II

| Example No. | Partial Pressure (mm.) | | | | | Temp., °C. | Description |
|---|---|---|---|---|---|---|---|
| | Hydrogen | Helium | Neon | Argon | Carbon Monoxide | | |
| 24 | | | | | 5 | 1,375 | 9 |
| 25 | | | | | 50 | 1,375 | 6 |
| 26 | | | | | 100 | 1,375 | 3 |
| 27 | | 755 | | | 5 | 1,440 | 5 |
| 28 | | 710 | | | 50 | 1,440 | 8 |
| 29 | | 660 | | | 100 | 1,440 | 5 |
| 30 | | 510 | | | 250 | 1,440 | 3 |
| 31 | 660 | | | | 100 | 1,525 | 7 |
| 32 | 510 | | | | 250 | 1,525 | 10 |
| 33 | 410 | | | | 350 | 1,525 | 7 |
| 34 | | 710 | | | 50 | 1,525 | 7 |
| 35 | | 660 | | | 100 | 1,525 | 7 |
| 36 | | 510 | | | 250 | 1,525 | 10 |
| 37 | | 460 | | | 300 | 1,525 | 8 |
| 38 | | 410 | | | 350 | 1,525 | 7 |
| 39 | | | 660 | | 100 | 1,525 | 7 |
| 40 | | | 510 | | 250 | 1,525 | 9 |
| 41 | | | 410 | | 350 | 1,525 | 6 |
| 42 | | | | 660 | 100 | 1,525 | 5 |
| 43 | | | | 510 | 250 | 1,525 | 8 |
| 44 | | | | 410 | 350 | 1,525 | 4 |
| 45 | 660 | | | | 100 | 1,565 | 7 |
| 46 | 510 | | | | 250 | 1,565 | 9 |
| 47 | 460 | | | | 300 | 1,565 | 9 |
| 48 | 410 | | | | 350 | 1,565 | 10 |
| 49 | 360 | | | | 400 | 1,565 | 10 |
| 50 | 260 | | | | 500 | 1,565 | 8 |
| 51 | | 660 | | | 100 | 1,565 | 7 |
| 52 | | 510 | | | 250 | 1,565 | 9 |
| 53 | | 460 | | | 300 | 1,565 | 9 |
| 54 | | 410 | | | 350 | 1,565 | 10 |
| 55 | | 360 | | | 400 | 1,565 | 10 |
| 56 | | 260 | | | 500 | 1,565 | 8 |
| 57 | | | 510 | | 250 | 1,565 | 8 |
| 58 | | | 410 | | 350 | 1,565 | 9 |
| 59 | | | 360 | | 400 | 1,565 | 8 |
| 60 | | | 260 | | 500 | 1,565 | 7 |
| 61 | | | | 510 | 250 | 1,565 | 7 |
| 62 | | | | 410 | 350 | 1,565 | 8 |
| 63 | | | | 360 | 400 | 1,565 | 7 |
| 64 | | | | 260 | 500 | 1,565 | 6 |

Table II clearly illustrates the relationship which temperature and the pressure of carbon monoxide within the reaction chamber have upon the rate and quantity of fiber growth. Hence, since the rate of the gaseous transport of SiO and CO is quite slow at 1375° C., the partial pressure of the CO atmosphere must be kept low to avoid excessive repression of the reaction between the carbon and silica. Further, a comparison of Examples 27–30 with Examples 1–4 of Table I demonstrates the repressing effect an atmosphere of high pressure has upon the reaction. Thus, the yields of fibers in Examples 27–30 were considerably less than in Examples 1–4 although the partial pressure of CO was the same. At temperatures above about 1500° C. the reaction between carbon and silica is very rapid and much higher partial pressures of carbon monoxide are required to optimize the production of fibers. This very rapid rate of reaction recommends itself for commercial practice and temperatures of about 1525° C. have been found particularly suitable for producing fibers on a commercial scale. Also, it can be observed from a comparison of Examples 34–37 with Examples 28–30 that this great increase in the rate of reaction somewhat lessens the repression effect resulting from the utilization of a total pressure of one atmosphere within the reaction chamber. Nevertheless, the examples set out in this table illustrate at high temperatures the partial pressure of carbon monoxide in the reaction system has a practical useful maximum. Thus, while at 1375° C. carbon monoxide at a partial pressure of about 5 mm. of mercury promotes a good yield of fibers, a partial pressure of carbon monoxide of about 400 mm. of mercury provides for optimum growth at 1565° C. However, even at these high temperatures, carbon monoxide at a partial pressure much greater than 500 mm. exerts an excessively undesirable repressive effect upon the reaction of silica and carbon. In summation, then, the two principal points which Table II illustrates are: (1) as the temperature at which the reaction is carried out is increased, the partial pressure of carbon monoxide required for optimum yield must also be increased; and (2) the major effect upon the rate of reaction where the temperature is held constant is the partial pressure of carbon monoxide, the partial pressure of the inert gas having but a secondary effect.

Since, as has been demonstrated in the above tables, the lower molecular weight inert gases are to be preferred as diluent gases for the carbon monoxide to provide a total pressure of one atmosphere within the reaction chamber, the logical choice would be hydrogen. However, the difference in yields between hydrogen and helium is not considerable and this, combined with the inherent safety in using helium, has led to the use of helium as the preferred diluent gas. Although no specific example of such has been recorded in the tables, it will be appreciated that mixtures of two or more of the indicated inert gases may be utilized as the filler gas with the carbon monoxide.

Finally, it will be understood that modifications in the design of the reaction apparatus and in the sequence of operations may be made without departing from the scope of the invention so long as the required interrelation of temperature, time, and ambient atmosphere is observed. Thus, experimentation has demonstrated that the quantity and character of the fiber growth can be controlled by regulating the temperature and time of the reaction with respect to the partial pressure of the carbon monoxide introduced into the reaction chamber. Nevertheless, the selection of these parameters can be readily determined by one skilled in the art within the framework of the basic description set forth above.

I claim:
1. Submicroscopic fibers consisting of a core of beta-silicon carbide with a surface sheath of silica.
2. Fibers according to claim 1 having relatively uniform diameters of about 0.025 micron.
3. Fibers according to claim 1 having a maximum length-to-diameter ratio of about 40,000:1.
4. A method for manufacturing silica-sheathed, submicroscopic fibers containing beta-silicon carbide crystals comprising the steps of providing a mixture of silica and carbon in a molar ratio ranging between about 1:1 to 1:4 in a reaction chamber, contacting said mixture at a temperature ranging about 1375°–1575° C. with an atmosphere containing carbon monoxide, carbon monoxide being introduced into said reaction chamber at a partial pressure ranging from about 5–500 mm. of mercury, maintaining said temperature and atmosphere for a period of time sufficient to attain the desired fiber formation, after which the fibers are cooled to room temperature.

5. A method of manufacturing submicroscopic fibers according to claim 4 wherein the atmosphere consists of a mixture of carbon monoxide and at least one inert gas selected from the group consisting of hydrogen, helium, neon, and argon.

6. A method of manufacturing submicroscopic fibers according to claim 4 wherein the period of time sufficient to attain the desired fiber formation ranges from about 2–24 hours.

7. A method for manufacturing silica-sheathed, submicroscopic fibers containing beta-silicon carbide crystals comprising the steps of providing a mixture of silica and carbon in a molar ratio ranging between about 1:1 to 1:4 in a reaction chamber, evacuating said chamber to an absolute pressure of not more than about 5 mm. of mercury, thereafter contacting said mixture at a temperature of about 1375°–1575° C. with an atmosphere containing carbon monoxide, carbon monoxide being introduced into said reaction chamber at a partial pressure ranging from about 5–500 mm. of mercury, maintaining said temperature and atmosphere for a period of time sufficient to attain the desired fiber formation after which the fibers are cooled to room temperature.

8. A method for manufacturing submicroscopic fibers according to claim 7 wherein the reaction chamber is evacuated to an absolute pressure of less than 1 mm. of mercury.

9. A method for manufacturing submicroscopic fibers according to claim 7 wherein the atmosphere consists of a mixture of carbon monoxide and at least one inert gas selected from the group consisting of hydrogen, helium, neon, and argon.

10. A method for manufacturing submicroscopic fibers according to claim 7 wherein the period of time sufficient to attain the desired fiber formation ranges from about 2–24 hours.

11. A method for manufacturing silica-sheathed, submicroscopic fibers containing beta-silicon carbide crystals comprising the steps of providing a mixture of silica and carbon in a molar ratio of about 1:2 in a reaction chamber, simultaneously evacuating said chamber to an absolute pressure less than 1 mm. of mercury and heating said chamber to about 1375°–1575° C. and maintaining this temperature for about 2–24 hours while introducing an atmosphere containing carbon monoxide at a partial pressure ranging from 5–500 mm. of mercury, subsequently cooling the chamber to about 600° C., introducing air thereinto, and finally cooling the fibers to room temperature.

12. A method for manufacturing submicroscopic fibers according to claim 11 wherein the reaction chamber is heated to about 1525° C.

13. A method for manufacturing submicroscopic fibers according to claim 12, wherein the time for maintaining the reaction temperature is about 3 hours.

14. A method for manufacturing submicroscopic fibers according to claim 12 wherein the partial pressure of carbon monoxide in the atmosphere is about 250 mm. of mercury.

15. A method for manufacturing submicroscopic fibers according to claim 11 wherein the atmosphere consists of a mixture of carbon monoxide and at least one inert gas selected from the group consisting of hydrogen, helium, neon, and argon.

16. A method for manufacturing submicroscopic fibers according to claim 15 wherein the partial pressure of carbon monoxide in the atmosphere is about 250 mm. of mercury and the partial pressure of the inert gas is about 510 mm. of mercury.

References Cited

UNITED STATES PATENTS

| | | | |
|---|---|---|---|
| 3,161,473 | 12/1964 | Pultz | 23—208 |
| 3,215,547 | 11/1965 | Parr | 106—44 X |
| 3,236,673 | 2/1966 | O'Connor et al. | 23—208 X |
| 3,246,950 | 4/1966 | Gruber | 23—208 |
| 3,271,109 | 9/1966 | Mezey et al. | 23—208 |

OSCAR R. VERTIZ, *Primary Examiner.*

G. T. OZAKI, *Assistant Examiner.*